June 26, 1956 — W. C. DUNLAP, JR — 2,752,434
MAGNETO-RESPONSIVE DEVICE
Original Filed Oct. 19, 1949
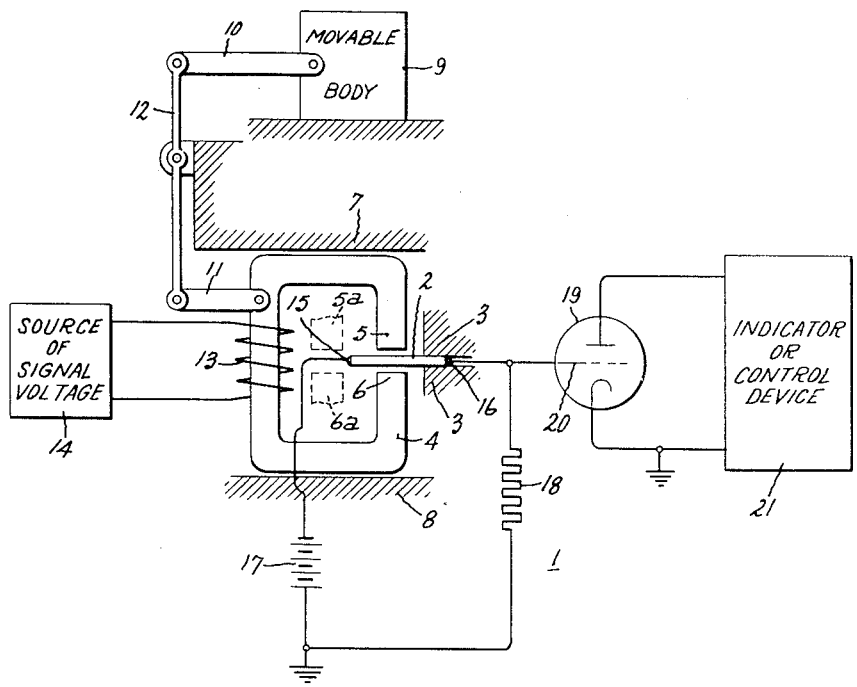
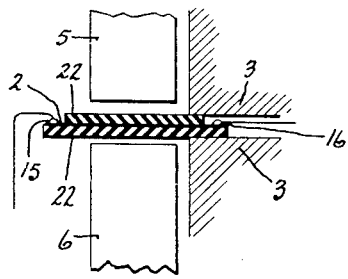
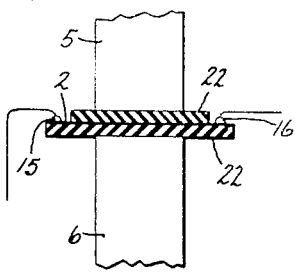
Inventor:
William Crawford Dunlap Jr,
by Paul A. Frank
His Attorney.

United States Patent Office 2,752,434
Patented June 26, 1956

2,752,434

MAGNETO-RESPONSIVE DEVICE

William Crawford Dunlap, Jr., Schenectady, N. Y., assignor to General Electric Company, a corporation of New York Original application October 19, 1949, Serial No. 122,243. Divided and this application March 22, 1952, Serial No. 278,055

4 Claims. (Cl. 179—171)

This invention relates to a magneto-responsive device system employing a semi-conductor, the electrical resistance of which is controllable by a magnetic field. This application is a division of my application, Serial No. 122,243, filed October 19, 1949, entitled, "Magneto-Responsive Device Control System," and assigned to the present assignee, which is abandoned.

Known magneto-responsive systems which are capable of producing an electrical signal output are generally of the type employing a magneto-inductive transformer having a variably excited primary winding or a magneto-inductive generator having a physically relatively movable magnetic armature. In any of these magneto-inductive systems the output voltage signal is dependent upon a rate of change in a magnetic field which is produced in the transformer by a changing current in a primary winding, and in the generator by the relative movement between the magnetic parts. However, it is often desirable to obtain an electrical signal which subsists when no change occurs and when no rate of change exists, but a signal which nevertheless indicates the magnitude of a direct current excitation signal in an apparatus with relatively fixed parts or indicates the relative positions of relatively movable parts, while at the same time giving an indication of magnitude of input signal or change of relative position in terms of the magnitude of excitation or instantaneous position in these devices.

It is, therefore, an object of my invention to provide a magneto-responsive device system which is a direct current amplifier as well as an alternating current amplifier.

It is a further object of my invention to provide a magneto-responsive device system which may be used as a position indicator to indicate the relative positions of two relatively movable parts in terms of the electrical resistance of an output circuit or the magnitude of an electrical output derived therefrom.

A still further object of my invention is to provide a magneto-responsive device having an unusually high degree of resistance variation in response to a given small change in magnetic field excitation.

The invention, therefore, generally comprises an arrangement including a paper-thin semi-conductor element the resistance of which is responsive to a magnetic field therethrough, an apparatus for the creation of such a magnetic field in accordance with an input signal, and lead connections for the measurement of the resistance of the semi-conductor.

The features which I desire to protect are pointed out with particularity in the appended claims. The invention itself, together with further objects and advantages thereof, may be best understood by reference to the following description taken in connection with the drawing, in which Fig. 1 shows the magneto-responsive device system of this invention including electrical circuit components which are shown schematically; Fig. 2 is an enlarged detail view of a second embodiment of the invention wherein the semi-conductor element is in the form of a very thin sheet or strip mechanically supported and protected by insulating members; and Fig. 3 is a corresponding view of a third embodiment of the invention wherein no relative movement between the semi-conductor element and the magnetic structure is provided for, whereby the gap in the magnetic structure for the accommodation of the semi-conductor element and insulating members is held to a minimum dimension.

Referring more particularly to the drawing, in Fig. 1 there is shown a magneto-responsive device system which includes a semi-conductor element or member 2 held in a fixed position by clamping members 3. The semi-conductor itself may be characterized as a magneto-responsive device. A magnetic structure 4, with pole pieces 5 and 6, is positioned to set up a magnetic field through semi-conducting member 2. Magnetic structure 4 is adapted for movement along guides 7 and 8. This movement may occur in response to movements of a movable body 9 transmitted through a suitable linkage such as that comprising links 10 and 11 and lever 12. Magnetic structure 4 may be a permanent magnet or an electromagnet with an excitation winding 13 which may be energized from a source of signal voltage 14. Suitable electrical connections to the semi-conductor element 2 are made at 15 and 16. A resistance measuring circuit provided at these connections comprises a source of electrical energy such as battery 17 and a load resistor 18 which are connected in series with the semi-conductor element 2. The voltage of battery 17 is, therefore, impressed across the semi-conductor and the load resistor 18 in series. The relative magnitudes of the respective voltages across these two resistances may be measured by a device such as an electron discharge device 19 having a control electrode 20 to which voltage across resistor 18 may be applied. The output of device 19 may be fed to an indicator or control device 21 for establishing a control in accordance with the input signal from source 14.

In the operation of the magneto-responsive device of this invention, a suitable electrical signal which may comprise an alternating current voltage or a direct current voltage or a combination of the two may be supplied from signal voltage source 14 and used to energize winding 13 to create a magnetic field in magnetic structure 4 in accordance therewith. The magnetic field which then exists between pole pieces 5 and 6 passes through semi-conductor element 2. Element 2 comprises a semi-conductor material, such as germanium, whose electrical resistance is dependent upon the flux density of a magnetic field therethrough. In this connection it has been found that, in an element of germanium, a magnetic field flux density of 12,000 gauss causes as much as a 25% increase in resistivity over the value of resistivity with no magnetic field. Element 2 is preferably of a highly purified type of germanium characterized by freedom from such impurities as aluminum, tin, arsenic, and gallium, since the presence of these elements, even in small amounts, lowers the resistivity of the germanium. Germanium having an unmagnetized resistivity above 5 ohm-centimeters is preferable. Such high resistivity is desired because the increase of resistance of germanium in the presence of a magnetic field, hereinafter referred to as the magneto-resistive effect, is proportional to the unmagnetized resistivity of the material. Semi-conductors which exhibit this effect are hereinafter referred to as semi-conductors having magneto-resistive properties.

Element 2 is connected in series with register 18 and a voltage is impressed across both by means of battery 17. Variations in the resistance of element 2 due to the magneto-resistive effect cause variations in the proportion of the supply voltage from battery 17 which exists at a given time across element 2 and resistance 18. As a result, the voltage at the common connection between element 2 and resistor 18 supplied to control electrode 20 of electron discharge device 19 fluctuates with respect to ground. The signal thus derived is amplified by electron discharge device 19 and supplied to an indicator or control device 20. Device 20 may be any visual or audible indicator suitable to bring attention to the condition causing the signal from source 14. Alternatively, it may comprise an automatic control device for controlling temperature or any other condition or function controllable by an electrical voltage.

The magneto-responsive device system of this invention may also indicate or control in response to physical movements of a movable body such as 9. Through a suitable linkage such as that provided by members 10, 11 and 12 movement of body 9 causes a corresponding movement of magnetic structure 4 so that pole pieces 5 and 6 gradually assume a new position, for instance as at 5a and 6a. In this new position, the magnetic field provided by a magnetic field structure 4 no longer traverses the semi-conductor element 2 and the resulting change in the resistivity of element 2 effects an indication or control signal at indicator or control device 21 in accordance with the new position of movable body 9.

Element 2 may comprise a slab or wafer of semi-conductor material and the electrical connections at 15 and 16 may be made by soldering suitable conductors to the semi-conductor element at the edges thereof. Pure tin solder is preferably used, although other soldering materials may be found to be satisfactory.

Fig. 2 is a detail view of an embodiment of the invention wherein the semi-conductor element 2 comprises a sheet or strip of the order of a few, preferably less than five, thousandths of an inch in thickness, which may be characterized as "paper" thin. The resistance of the element is thus increased to increase the magneto-resistive effect, which, as stated above, is proportional to the resistance. Suitable members 22 of rigid insulating material may be used in this embodiment to impart structural strength to element 2 since the semi-conductor material itself, because of its thinness, is structurally weak.

In Fig. 3 there is shown a structure similar to that of Fig. 2 which may be employed where there is to be no movement of magnetic structure 4 and pole pieces 5 and 6 relative to element 2. In this arrangement, the insulating members 22 and the semi-conductor element 2 may be tightly fitted and supported between pole pieces 5 and 6. Also, insulating members 22 may be reduced to a minimum thickness since the structural strength for the cantilever construction of Fig. 2 is not needed, adequate electrical insulation being the only critical requirement. By means of this construction, the gap between pole pieces 5 and 6 may be kept to a minimum dimension so that a lower energy input is required for magnetic structure 4 to obtain the desired flux density in semi-conductor element 2. Clamping members 3 are unnecessary since the element is supported by pole pieces 5 and 6.

It will be seen from the above description that this invention provides for a magneto-responsive device system which produces a signal in response to, and proportional to the strength of, a magnetic field and independent of the rate of change thereof which will provide indicator or control voltages useful in many applications.

While only certain preferred embodiments of the invention have been shown by way of illustration, many modifications will occur to those skilled in the art and it is, therefore, to be understood that the appended claims are intended to cover all such modifications as fall within the true spirit and scope of the invention.

What I claim as new and desire to secure by Letters Patent of the United States is:

1. A magneto-responsive device system for providing an amplified replica of a signal voltage comprising an electromagnetic structure having a winding excited in accordance with said signal voltage, a paper-thin high resistance germanium sheet arranged entirely within a gap in said magnetic structure, the resistance of said germanium sheet being controlled by a magnetic field set up by said structure, sheet-supporting insulating members secured to opposite faces of said sheet, connections at opposite edges of said sheet for supplying a current through said germanium sheet in a direction perpendicular to said magnetic field to derive an output voltage between said connections varying in accordance with the resistance of said sheet, a voltage source connected to one of said connections, and a load element connected to the remaining connection, said voltage source, said germanium sheet, and said load element being connected in series circuit relationship.

2. A magneto-responsive control device comprising a paper-thin high resistivity germanium sheet having magneto-resistive properties, an electromagnetic structure having closely spaced magnetic poles, sheet-supporting insulating members secured to and between each pole and a respective major face of said sheet, connections to opposite edges of said sheet for supplying a current therethrough, a voltage source connected to one of said connections, and a load element connected to the remaining connection, said voltage source, said germanium sheet, and said load element being connected in series circuit relationship.

3. A magneto-responsive control device comprising an electromagnet having closely spaced pole pieces, a magneto-resistive element supported between said pole pieces comprising a paper-thin high resistivity germanium sheet having insulating supporting plates secured to opposite faces of said sheet, connections to opposite edges of said germanium sheet for supplying a current therethrough, a voltage source connected to one of said connections, and a load element connected to the remaining connection, said voltage source, said germanium sheet, and said load element being connected in series circuit relationship.

4. A magneto-responsive device system comprising a magnet having spaced aligned pole pieces, a magneto-resistive element comprising a paper-thin high resistivity germanium sheet having insulating supporting plates secured to its opposite major faces, said element being supported within the magnetic field produced between said pole pieces, connections to opposite edges of said sheet for supplying a current therethrough, a voltage source connected to one of said connections, a load element connected to the remaining connection, said voltage source, said germanium sheet, and said load element being connected in series circuit relationship, and means for producing relative movement between said element and said magnet to vary the intensity of the magnetic field through said element.

References Cited in the file of this patent

UNITED STATES PATENTS

| | | |
|---|---|---|
| 543,843 | Biggar | Aug. 6, 1895 |
| 1,596,558 | Sokoloff | Aug. 17, 1926 |
| 1,778,796 | Craig | Oct. 21, 1930 |
| 1,794,376 | Hartsough | Mar. 3, 1931 |
| 2,226,847 | Clark | Dec. 31, 1940 |
| 2,464,807 | Hansen | Mar. 22, 1949 |
| 2,500,953 | Libman | Mar. 21, 1950 |
| 2,571,915 | McCoubrey | Oct. 16, 1951 |

OTHER REFERENCES

"Non-Rectifying Germanium" from the Physical Review, vol. 74, issue 8, page 976, published Aug. 15, 1948.